United States Patent
Perfetto et al.

(10) Patent No.: US 11,536,226 B2
(45) Date of Patent: Dec. 27, 2022

(54) ENGINE ARRANGEMENTS WITH EGR SYSTEMS

(71) Applicant: Cummins Inc., Columbus, IN (US)

(72) Inventors: Anthony Kyle Perfetto, Columbus, IN (US); Samuel C. Geckler, Columbus, IN (US); Hongfeng H. Wang, Wuhan (CN)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/227,574

(22) Filed: Apr. 12, 2021

(65) Prior Publication Data

US 2021/0231083 A1    Jul. 29, 2021

Related U.S. Application Data

(60) Division of application No. 16/241,671, filed on Jan. 7, 2019, now Pat. No. 11,008,981, which is a
(Continued)

(51) Int. Cl.

| | |
|---|---|
| *F02M 26/43* | (2016.01) |
| *F02B 37/02* | (2006.01) |
| *F02B 75/18* | (2006.01) |
| *F02M 26/09* | (2016.01) |
| *F02M 26/08* | (2016.01) |
| *F02M 26/23* | (2016.01) |

(Continued)

(52) U.S. Cl.
CPC ......... *F02M 26/09* (2016.02); *F02B 29/0412* (2013.01); *F02B 37/001* (2013.01); *F02B 37/025* (2013.01); *F02M 26/08* (2016.02); *F02M 26/23* (2016.02); *F02M 26/43* (2016.02); *F02B 2075/1824* (2013.01); *Y02T 10/12* (2013.01)

(58) Field of Classification Search
CPC ............... F02M 26/43; F02B 37/025; F02D 2041/0012
See application file for complete search history.

(56) References Cited

U.S. PATENT DOCUMENTS

| | | | |
|---|---|---|---|
| 6,422,222 B1 | 7/2002 | Arbeiter et al. | |
| 6,935,319 B2 * | 8/2005 | Aupperle | F02M 26/05 60/605.2 |

(Continued)

FOREIGN PATENT DOCUMENTS

| | | |
|---|---|---|
| FR | 2993933 A1 | 1/2014 |
| JP | 2005163752 A | 6/2005 |

(Continued)

*Primary Examiner* — Ngoc T Nguyen
(74) *Attorney, Agent, or Firm* — Taft Stettinius & Hollister LLP (57) ABSTRACT

Systems, apparatus, and methods are disclosed that include a divided exhaust engine with at least one pair of primary EGR cylinders and a plurality of pairs of non-primary EGR cylinders. The pair of primary EGR cylinders can be connected to an intake with an EGR system that lacks an EGR cooler. In another embodiment, the cylinder pairs include exhaust flow paths that join in the cylinder head to form a common exhaust outlet for each cylinder pair in the cylinder head that is connected directly to the EGR system or to the exhaust system without an exhaust manifold.

18 Claims, 3 Drawing Sheets

Related U.S. Application Data continuation of application No. 15/195,151, filed on Jun. 28, 2016, now Pat. No. 10,215,134.

(60) Provisional application No. 62/187,908, filed on Jul. 2, 2015.

(51) Int. Cl.
   *F02B 29/04* (2006.01)
   *F02B 37/00* (2006.01)

(56) References Cited

U.S. PATENT DOCUMENTS

| | | |
|---|---|---|
| 7,080,635 B2 | 7/2006 | Sato |
| 7,426,830 B2 | 9/2008 | Schorn et al. |
| 7,444,815 B2 | 11/2008 | Baumgard et al. |
| 8,020,539 B2 | 9/2011 | Maunoury |
| 8,096,124 B2 | 1/2012 | Pierpont et al. |
| 8,291,891 B2 | 10/2012 | Alger, II et al. |
| 8,528,530 B2 | 9/2013 | Freund et al. |
| 8,857,156 B2 | 10/2014 | Primus et al. |
| 9,091,233 B2 | 7/2015 | Hardman |
| 9,249,761 B2 | 2/2016 | Talwar et al. |
| 2008/0257317 A1 | 10/2008 | Cerabone et al. |
| 2010/0024416 A1 | 2/2010 | Gladden et al. |
| 2012/0011845 A1 | 1/2012 | Williams et al. |
| 2012/0078492 A1 | 3/2012 | Freund et al. |
| 2012/0285161 A1 | 11/2012 | Kerns et al. |
| 2013/0000614 A1* | 1/2013 | Freund ............ F02M 26/38 123/568.2 |
| 2014/0196697 A1 | 7/2014 | Burrahm |
| 2014/0208727 A1* | 7/2014 | Hayman ............ F01N 13/10 60/323 |
| 2014/0223903 A1* | 8/2014 | Keating ............ F02M 26/19 60/605.2 |
| 2014/0366532 A1* | 12/2014 | Talwar ............ F01N 13/107 60/273 |
| 2015/0121853 A1 | 5/2015 | Moravec et al. |
| 2016/0053729 A1 | 2/2016 | Geckler et al. |
| 2017/0002772 A1* | 1/2017 | Perfetto ............ F02M 26/09 |
| 2017/0276095 A1 | 9/2017 | Beyer et al. |
| 2018/0171908 A1* | 6/2018 | Ulrey ............ F02D 41/1448 |
| 2019/0136800 A1* | 5/2019 | Perfetto ............ F02M 26/09 |
| 2019/0145360 A1* | 5/2019 | Talwar ............ F01N 13/107 60/605.2 |

FOREIGN PATENT DOCUMENTS

| | | | |
|---|---|---|---|
| WO | 2013175091 A1 | 11/2013 | |
| WO | WO-2015027335 A1 * | 3/2015 | ............ F01N 13/107 |
| WO | WO-2018222201 A1 * | 12/2018 | ............ F02B 75/20 |

* cited by examiner

ENGINE ARRANGEMENTS WITH EGR SYSTEMS

CROSS-REFERENCE TO RELATED APPLICATIONS

The present application is a divisional of U.S. patent application Ser. No. 16/241,671 filed Jan. 7, 2019, which is a continuation of U.S. patent application Ser. No. 15/195,151 filed Jun. 28, 2016, which claims the benefit of U.S. Provisional Application Ser. No. 62/187,908 filed Jul. 2, 2015, the disclosures of which are hereby incorporated by reference.

The present application is a continuation of U.S. patent application Ser. No. 15/195,151 filed Jun. 28, 2016, which claims the benefit of U.S. Provisional Application Ser. No. 62/187,908 filed Jul. 2, 2015, the disclosures of which are hereby incorporated by reference.

BACKGROUND

Engines operating with one or more cylinders as dedicated exhaust gas recirculation (EGR) cylinders enjoy greatly simplified controls and pressure management, fewer hardware devices, and other benefits. However, these simplifications come at the cost of a loss of control over the system. For example, cylinder deactivation in turbocharged systems that include dedicated EGR can affect the exhaust flow through the turbocharger and the distribution of EGR flow into the intake flow. In addition, twin turbocharger arrangements require complicated plumbing arrangements, additional components, and high temperature capable exhaust manifolds, increasing cost and complexity of these systems. Therefore, further technological developments are desirable in this area.

SUMMARY

One embodiment is a unique system, method and/or apparatus that includes a divided exhaust engine with at least one pair of primary EGR cylinders and at least two pairs of non-primary EGR cylinders. The exhaust flow from the primary EGR cylinders is returned to the intake and the exhaust flow from each pair of the non-primary EGR cylinders is provided to a respective turbine in the exhaust system.

In a further embodiment, the cylinders in each cylinder pair are physically adjacent to one another in the cylinder head so the exhaust outlets of the cylinders in each cylinder pair are combined in the cylinder head to form a common exhaust passage or common EGR passage in the cylinder head. The common EGR passage of the primary EGR cylinder pair is directly connected to an EGR cooler without an EGR manifold. In some embodiments, the EGR cooler is mounted directly to the cylinder head at the outlet of the common EGR passage. The common exhaust passages of the non-primary EGR cylinder pairs are each directly connected to a corresponding turbine mounted adjacent to the cylinder head at the outlet of the corresponding common exhaust passage without an intervening exhaust manifold. In some embodiments the turbine is mounted directly to the cylinder head.

In a specific embodiment, a six cylinder engine with primary EGR cylinders is provided in which the first and second cylinders are paired non-primary EGR cylinders and the fifth and sixth cylinders are paired non-primary EGR cylinders, and the third and fourth cylinders are paired primary EGR cylinders. The exhaust flow from the third and fourth cylinders is outlet from the cylinder head directly into an EGR cooler where it is then returned to the intake. The exhaust flow from the first and second cylinders is outlet from the cylinder head directly into a first turbine, and the exhaust flow from the fifth and sixth cylinders is outlet from the cylinder head directly into a second turbine. Cylinder deactivation of a first cylinder group including the first, second and third cylinders, or deactivation of a second cylinder group including the fourth, fifth and sixth cylinders, provides a properly functioning three cylinder EGR engine in which the exhaust flow from one primary EGR cylinder that is not deactivated is returned entirely to the intake and the exhaust flow from the other two non-primary cylinders that are not deactivated drives one of the turbines to compress intake flow.

In still another embodiment, a six cylinder in-line engine is provided in which the first and second cylinders are physically adjacent one another and paired non-primary EGR cylinders and the fifth and sixth cylinders are physically adjacent one another and paired non-primary EGR cylinders, and the third and fourth cylinders are physically adjacent one another and paired primary EGR cylinders. The exhaust flow from the third and fourth cylinders is returned directly to the intake without EGR cooling.

In yet another embodiment, a six cylinder V-bank engine is provided in which the two cylinders at one end are paired primary EGR cylinders, and the remaining two cylinders one side of the V-bank are paired non-primary EGR cylinders connected to a first turbocharger and the two remaining cylinders on the other side of the V-bank are pair non-primary EGR cylinders connected to a second turbocharger.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
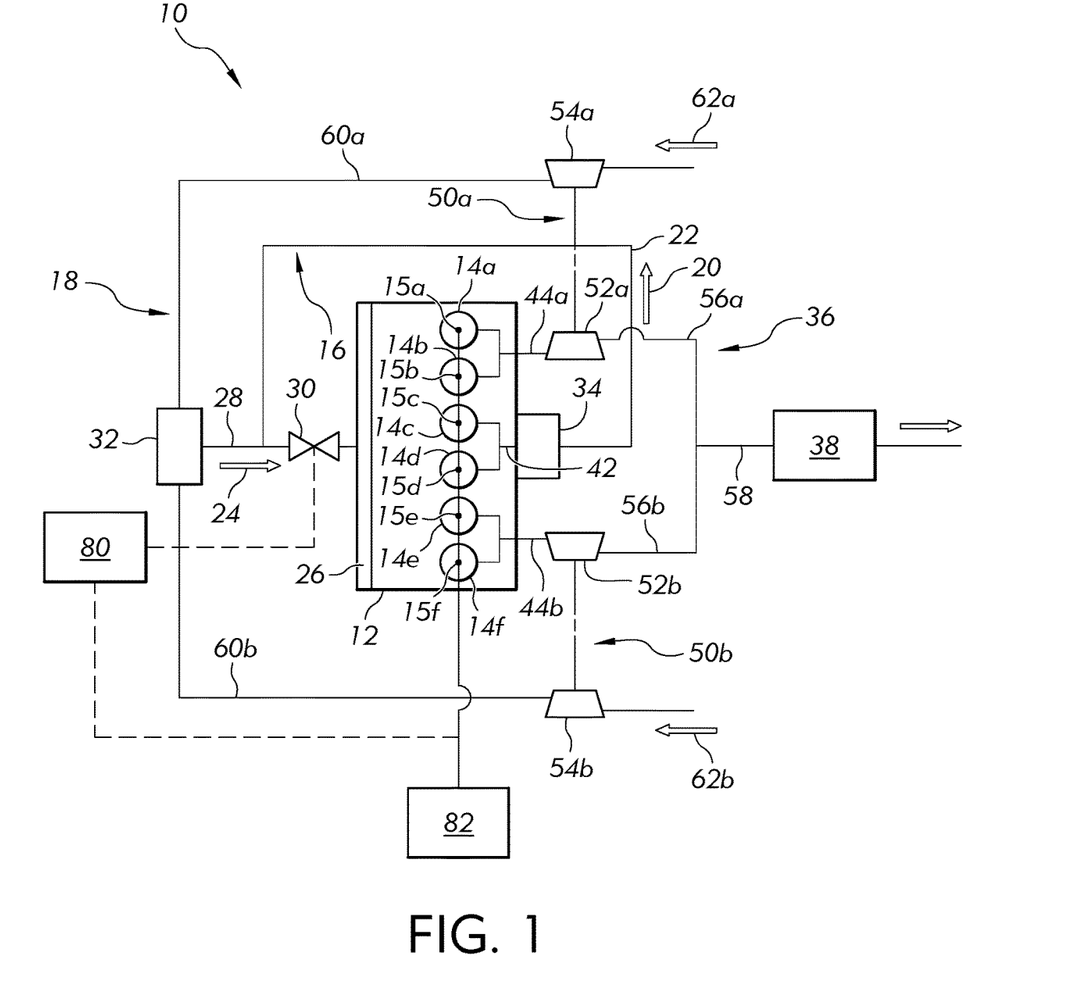
FIG. 1 is a schematic depiction of a system having an engine with primary EGR cylinders that primarily provide or are dedicated to providing EGR flow, and additional non-primary or secondary cylinders that do not or typically do not contribute to EGR flow.

Referencing FIG. 1, a system 10 is depicted having an engine 12. The engine 12 is an internal combustion engine of any type, and can include a stoichiometric engine, a gasoline engine, and/or a natural gas engine. In certain embodiments, the engine 12 includes a lean combustion engine such as a lean burn gasoline engine or a diesel cycle engine. In certain embodiments, the engine 12 may be any engine type producing emissions that may include an exhaust gas recirculation (EGR) system, for example to reduce NOx emissions from the engine 12. The engine 12 includes a plurality of cylinders 14a, 14b, 14c, 14d, 14e and 14f, collectively referred to as cylinders 14. The number of cylinders 14 may be any number suitable for an engine, although certain specific embodiments contemplate a six cylinder engine. The engine arrangement may be a six cylinder in-line arrangement as shown in FIG. 1, although V-shaped or other suitable arrangements are not precluded.

The engine 12 includes primary EGR cylinders 14c and 14d that are third and fourth cylinders and physically adjacent one another in the in-line arrangement. Engine 12 also includes other or remaining non-primary EGR cylinders 14a and 14b that are first and second cylinders and physically adjacent one another in the in-line arrangement, and non-primary EGR cylinders 14e and 14f that are physically adjacent one another and fifth and sixth cylinders in the in-line arrangement. Non-primary EGR cylinders 14a, 14b, 14e and 14f can be completely flow isolated from the EGR system 16, as discussed further below. The term primary EGR, as utilized herein, should be read broadly. Any EGR arrangement wherein, during at least certain operating conditions, the entire exhaust output of primary EGR cylinders 14c and 14d is recirculated to the engine intake system 18 is a primary EGR cylinder. A primary EGR cylinder typically, at least during primary EGR operation, includes exhaust divided from one or more of the remaining cylinders that are not primary EGR cylinders.

In the system 10, the EGR flow 20 recirculates in an EGR conduit 22 and combines with intake flow 24 at a position upstream of an intake manifold 26 of intake system 18. Intake manifold 26 provides a charge flow including the intake flow 24 combined with EGR flow 20. Intake manifold 26 is connected to an intake passage 28 that includes an intake throttle 30 to regulate the charge flow to cylinders 14. Intake passage 28 may also include a charge air cooler 32 to cool the charge flow provided to intake manifold 26.

The EGR flow 20 may combine with the intake flow 24 at an outlet of EGR conduit 22 through, for example, a restriction such as a mixer or any other suitable arrangement (not shown.) In certain embodiments, the EGR flow 20 returns to the intake manifold 26 directly. The EGR system 16 may be a low-pressure loop, for example returning to the intake at a position upstream of a compressor in the intake system 18, or a high-pressure loop, for example returning to the intake at a position downstream of the compressor and/or at the intake manifold 26. In certain embodiments, the system 10 includes an EGR cooler 34 between engine 12 and the EGR conduit 22. In other embodiments, EGR conduit 22 can include a bypass with a valve that selectively allows EGR flow to bypass the EGR cooler 34. The presence of an EGR cooler bypass is optional and non-limiting.

Figure 2:
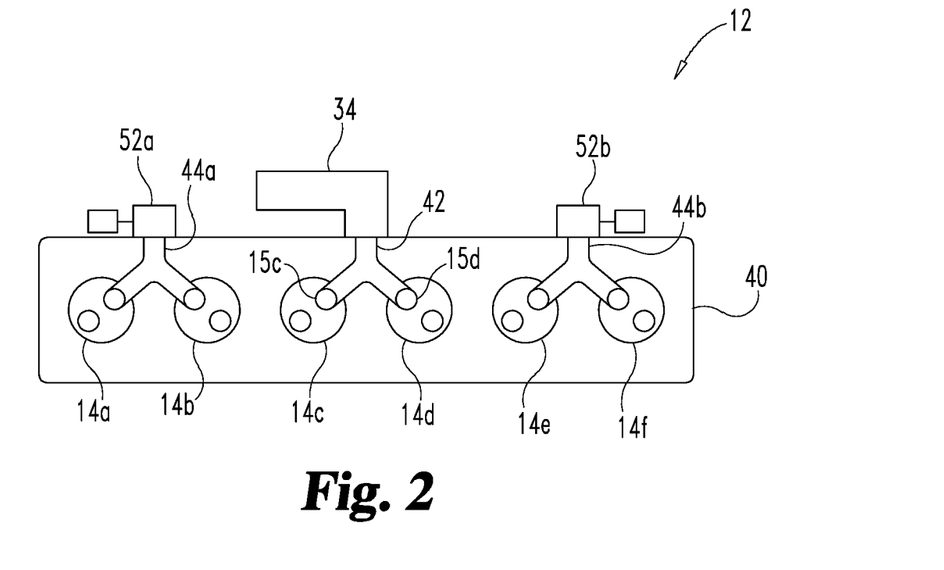
FIG. 2 is a schematic depiction of a top plan view of a cylinder head of the engine of FIG. 1 with an EGR cooler and twin turbochargers.
Figure 3:
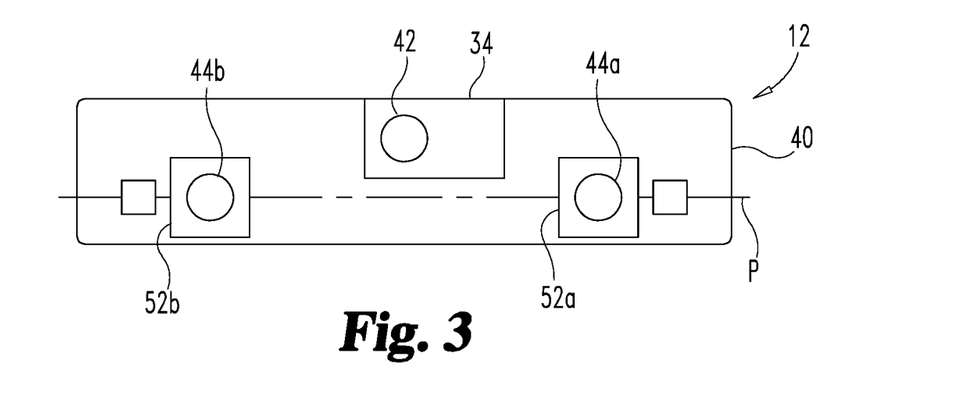
FIG. 3 is a schematic depiction of an elevation view of the cylinder head, EGR cooler, and twin turbochargers of FIG. 2.

Referring further to FIGS. 2-3, EGR cooler 34 is mounted directly to a flow outlet of cylinder head 40 of engine 12. EGR cooler 34 could also be mounted directly on cylinder head 40 or the engine block. Third and fourth primary EGR cylinders 14c, 14d each include at least one exhaust port 15c, 15d, respectively. Primary EGR cylinders 14c, 14d are mirrored to minimize the spacing between the exhaust ports 15c, 15d, and the exhaust ports 15c, 15d of cylinders 14c, 14d are joined to one another at a common EGR passage 42 formed, drilled, machined, or otherwise defined by and in cylinder head 40. EGR cooler 34 is mounted directly to a flow outlet of cylinder head 40 to receive the EGR flow from the outlet of the common EGR passage 42 and provide EGR flow 20 to EGR conduit 22 without an exhaust manifold.

First and second non-primary EGR cylinders 14a, 14b are also mirrored relative to one another and each includes at least one exhaust port that is adjacent to the exhaust port of the other mirrored non-primary EGR cylinder, and the exhaust ports from these cylinders 14a, 14b are joined at a first common exhaust passage 44a in cylinder head 40. Fifth and sixth non-primary EGR cylinders 14e, 14f are also mirrored relative to one another and each includes at least one exhaust port that is adjacent to the exhaust port of the other mirrored non-primary EGR cylinder, and the exhaust ports from these cylinders 14e, 14f are joined at a second common exhaust passage 44b in cylinder head 40.

System 10 includes an exhaust system 36 that does not include any exhaust manifold for any of the cylinders 14. Exhaust system 36 includes an aftertreatment system 38 to treat pollutants in the exhaust before the exhaust is outlet to the environment. Exhaust system 36 includes a first turbocharger 50a and a second turbocharger 50b. First turbocharger 50a includes a first turbine 52a and a first compressor 54a. Second turbocharger 50b includes a second turbine 52b and a second compressor 54b.

First turbine 52a is mounted directly to a flow outlet of cylinder head 40 to receive exhaust flow outlet from first common exhaust passage 44a without an intervening exhaust manifold. Second turbine 52b is mounted directly to a flow outlet of cylinder head 40 to receive exhaust flow outlet from second common exhaust passage 44b without an intervening exhaust manifold. As shown in FIG. 3, turbines 52a, 52b can be directly mounted to the outlets of cylinder head 40 in a first horizontal plane P, and EGR cooler 34 is vertically offset or staggered from plane P to allow space for mounting of the turbines 52a, 52b and EGR cooler 34 directly to the outlets of cylinder head 40 without interfering with one another. EGR cooler 34 is shown above turbines 52a, 52b, but could also be staggered vertically below turbines 52a, 52b. EGR cooler 34 can also be provided with ports that plug directly into the coolant ports of cylinder head 40 so that separate plumbing for providing coolant flow to EGR cooler 34 is not required.

Each turbine 52a, 52b includes an outlet that is connected with a respective one of separate exhaust conduits 56a, 56b, and exhaust conduits 56a, 56b join a common exhaust conduit 58 that includes the aftertreatment system 38. Other embodiments contemplate separate exhaust outlets and aftertreatment systems for each turbine 52a, 52b.

Turbines 52a, 52b are operable via the exhaust gases from the respective non-primary EGR cylinder pairs 14a, 14b and 14e, 14f to drive the respective compressor 54a, 54b to compress intake air flows 62a, 62b in the respective intake conduits 60a, 60b, which combine at intake air cooler 32. Other embodiments contemplate separate intake air coolers for each intake conduit 60a, 60b, or that an intake air cooler is omitted. Turbines 52a, 52b can be a variable geometry turbine with an adjustable inlet, or include a wastegate to bypass exhaust flow. Other embodiments contemplate an exhaust throttle (not shown) in the exhaust system 36.

In certain embodiments, the system 10 includes a controller 80 structured to perform certain operations to control a divided exhaust gas engine such as engine 12. In certain embodiments, the controller 80 forms a portion of a processing subsystem including one or more computing devices having memory, processing, and communication hardware. The controller 80 may be a single device or a distributed device, and the functions of the controller 80 may be performed by hardware or by instructions encoded on computer readable medium. The controller 80 may be included within, partially included within, or completely separated from an engine controller (not shown). The controller 80 is in communication with any sensor or actuator throughout the system 10, including through direct communication, communication over a datalink, and/or through communication with other controllers or portions of the processing subsystem that provide sensor and/or actuator information to the controller 80.

In certain embodiments, the controller 80 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of internal combustion engines, improvements in emissions performance, aftertreatment system performance, engine torque generation and torque control, engine fuel economy performance, improved durability of exhaust system components for internal combustion engines, and engine noise and vibration control. Without limitation, example and non-limiting technological fields that are improved include the technological fields of internal combustion engines and related apparatuses and systems as well as vehicles including the same.

Certain operations described herein include operations to interpret or determine one or more parameters. Interpreting and determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Certain systems are described following, and include examples of controller operations in various contexts of the present disclosure. In certain embodiments, a procedure includes an EGR flow 20 that is provided to the intake system 18 to mix with the intake flow and provide a charge flow to cylinders 14. The charge flow includes an amount of recirculated exhaust gas from primary EGR cylinders 14c, 14d.

The controller 80 is operable to interpret a cylinder deactivation condition and deactivate a group of cylinders 14 by cutting fuel flow thereto from a fuel source 82. For example, a first group of cylinders includes cylinders 14a, 14b and 14c, and a second group of cylinders includes cylinders 14d, 14e and 14f. Deactivation of one of the first and second groups cuts fueling to the cylinders in the group and closes the intake and exhaust valves to prevent airflow there through. This provides engine operation with the other group of cylinders, effectively providing a three cylinder EGR engine operation in which the route of EGR flow 20 that is provided by the active one of the primary EGR cylinders 14c, 14d is unaffected, and the turbocharger operation of the turbine receiving exhaust flow from the active cylinder pair 14a-b or 14e-f is unaffected. This is not the case with prior arrangements in which cylinder deactivation affects turbocharger operations and/or the fraction of EGR flow in the charge flow.

The system 10 can include a fueling system with fuel source 82 and fuel injectors connected to each of the cylinders 14. In certain embodiments, one or more or all of the cylinders 14a, 14b, 14c, 14d, 14e, 14f includes a direct injector 15a, 15b, 15c, 15d, 15e, 15f, respectively, for providing fuel from the fueling system. A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder or laterally. In certain embodiments, the direct injector may be structured to inject fuel into a combustion pre-chamber. Each cylinder 14 may include one or more direct injectors.

The direct injectors may be the primary or the only fueling device for the cylinders 14, or alternatively the direct injectors may be an auxiliary or secondary fueling device for the cylinders 14. In certain embodiments, the direct injectors are capable of providing the entire designed fueling amount for the cylinders 14 at any operating condition. Alternatively, the direct injectors may be only partially capable of providing the designed fueling amount, for example the direct injectors may be capable of providing a designated amount of fuel for a specific purpose.

In still other embodiments, one or all of the cylinders 14 include a port injector (not shown) in addition to or alternatively to direct injectors. In these embodiments, the intake manifold 26 may be divided (not shown) to separate the charge flows to the respective cylinder pairs 14a-b, 14c-d, and 14e-f, or the port fuel injectors may be positioned such that no other cylinder in the system 10 is downstream of the port fuel injector, i.e. only the target cylinder is downstream of the port fuel injector.

In certain embodiments, the controller 140 controls operation of the direct injectors or port injectors of cylinders 14 in response to the cylinder deactivation conditions to de-fuel one of the first and second groups of cylinders 14. De-fueling one of the groups provides improved fuel economy when cylinder deactivation conditions are enabled or detected, such as a steady state condition at certain operating conditions and/or at low operating loads.

Figure 4:
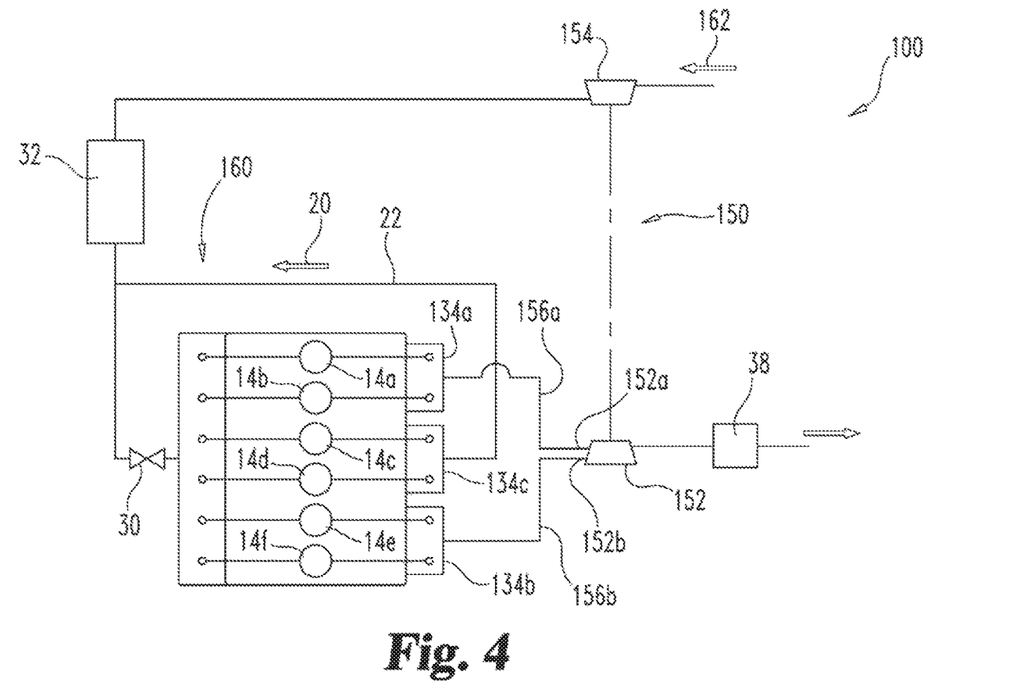
FIG. 4 is a schematic depiction of another embodiment system having primary EGR cylinders and non-primary EGR cylinders with an EGR passage connected to receive exhaust flow from the exhaust passage of the secondary EGR cylinders that are not the primary EGR cylinders.

Referring to FIG. 4, another embodiment system 100 is shown in which like elements with system 10 are designated with similar reference numerals. System 100 includes a single turbocharger 150 and exhaust manifold portions 134a, 134b connected with non-primary EGR cylinder pairs 14a-b and 14e-f respectively; however, such as with system 10 discussed above, twin turbochargers mounted directly to the cylinder head are also contemplated. Exhaust flow from exhaust manifold portions 134a, 134b drives turbine 152 to compress intake air flow 162 with compressor 154. In one embodiment, turbine 152 is a twin entry turbine and each cylinder pair 14a, 14b and 14e, 14f is connected to a separate one of the twin entries 152a, 152b with separate exhaust conduits 156a, 156b. In a further embodiment (now shown), cylinder pairs 14a, 14b and 14e, 14f each connect to respective one of first and second exhaust manifolds that are connected to the respective turbine inlets.

System 100 includes an EGR system 160 connected with an EGR manifold 134c that receives an EGR flow from primary EGR cylinders 14c-d. Therefore, the third and fourth cylinders 14, or primary EGR cylinders 14c-d, provide a high EGR fraction of 33% since there are six total cylinders in the illustrated embodiment. EGR system 160 lacks any EGR cooler and therefore the high EGR fraction of system 100 provides NOx reduction without EGR cooling. In addition, the non-cooled, high EGR fraction allows start of ignition to be advance to reduce brake specific fuel consumption and reduction of particulate matter emissions during combustion optimization.

Figure 5:
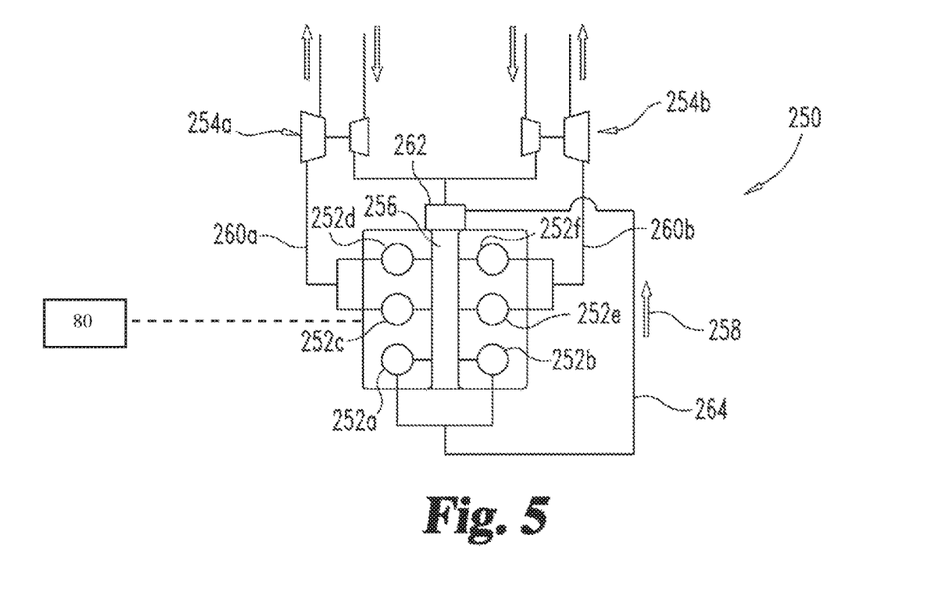
FIG. 5 is a schematic depiction of another embodiment system having an engine with primary EGR cylinders that primarily provide or are dedicated to providing EGR flow, and additional non-primary or secondary cylinders that do not or typically do not contribute to EGR flow.

In still another embodiment shown in FIG. 5, a six-cylinder V-bank engine 250 is provided in which the two cylinders 252a, 252b at one end are paired primary EGR cylinders and physically adjacent one another. The remaining two cylinders 252c, 252d on one side of the V-bank are paired non-primary EGR cylinders physically adjacent one another and connected to a first turbocharger 254a with first exhaust passage 260a. The two remaining cylinders 252e, 252f on the other side of the V-bank are paired non-primary EGR cylinders physically adjacent to one another and connected to a second turbocharger 254b with second exhaust passage 260b.

The exhaust flow 258 from the paired end cylinders 252a, 252b is returned directly to the intake 256 with an EGR passage 264. In one embodiment, an EGR cooler 262 is mounted to intake 256 to cool the EGR flow. In other embodiments, an EGR cooler is omitted.

Various aspects of the present disclosure are contemplated. In one aspect, a system includes an internal combustion engine including at least one pair of primary EGR cylinders connected to a common EGR passage to provide an EGR flow to an intake of the engine and a plurality of pairs of non-primary cylinders with each non-primary cylinder pair connected to a respective one of a plurality of common exhaust passages to provide an exhaust flow to a respective one of a plurality of turbines connected to the respective common exhaust passage.

In one embodiment, the common EGR passage and the common exhaust passages are formed in a cylinder head of the engine. In another embodiment, each of the plurality of turbines is mounted directly to the cylinder head at an outlet of the respective common exhaust passage, and the system further includes an EGR cooler mounted to the cylinder head at an outlet of the common EGR passage.

In another embodiment, each of the plurality of turbines includes a compressor in a respective intake conduit to compress an intake air flow. In a refinement of this embodiment, the compressed intake air flows from the intake conduits combine at an intake air cooler. In yet another embodiment, the system includes an intake passage connecting the intake cooler to the intake and the manifold and the common EGR passage is connected to the intake passage downstream of the intake air cooler. In still further embodiments, each of the turbines includes an outlet that is connected with a respective one of separate exhaust conduits that are joined at a common exhaust conduit connected to an aftertreatment system.

In another aspect, a system includes an internal combustion engine including six cylinders. First and second cylinders are adjacent one another and flow connected to a first turbine through a first common exhaust passage. Third and fourth cylinders are adjacent one another and flow connected to an EGR cooler through a common EGR passage and the EGR cooler is connected to an intake of the engine. Fifth and sixth cylinders are adjacent one another and flow connected to a second turbine through a second common exhaust passage.

In one embodiment, the EGR cooler and the first and second turbines are each flow coupled directly to a corresponding outlet of the common EGR passage and the first and second common exhaust passages, respectively. In another embodiment, the common EGR passage and the first and second common exhaust passages are formed in a cylinder head of the engine. In a refinement of this embodiment, the first and second turbines are flow coupled to the cylinder head in a first horizontal plane and the EGR cooler is offset vertically from the horizontal plane.

In yet another embodiment, the system includes a controller configured to selectively deactivate one of a first group of cylinders that includes the first, second and third cylinders and a second group of cylinders that includes the fourth, fifth and sixth cylinders. The controller operates the internal combustion engine as a three-cylinder internal combustion engine with EGR flow from one of the third and fourth cylinders and intake air flow compressed from only one of the first and second turbines.

In another aspect, a system includes an internal combustion engine with six cylinders. First and second cylinders are adjacent one another and flow connected to a first turbine through a first common exhaust passage. Third and fourth cylinders are adjacent one another and flow connected through a common EGR passage to an EGR conduit that is connected to an intake manifold of the engine without an EGR cooler between third and fourth cylinders and the intake. Fifth and sixth cylinders are adjacent one another and flow connected to a second turbine through a second common exhaust passage.

In one embodiment, the system includes a controller configured to selectively deactivate one of a first group of cylinders that includes the first, second and third cylinders and a second group of cylinders that includes the fourth, fifth and sixth cylinders. The controller is configured to operate the internal combustion engine as a three-cylinder internal combustion engine with EGR flow from one of the third and fourth cylinders and intake air flow compressed from only one of the first and second turbines.

In another embodiment, the first and second turbines are each flow coupled directly to a corresponding outlet of the first and second common exhaust passages, respectively. In a refinement of this embodiment, the common EGR passage and the first and second common exhaust passages are formed in a cylinder head of the engine.

In another aspect, a system includes an internal combustion engine having six cylinders in a V-bank. First and second cylinders along a first side of the V-bank are adjacent one another and flow connected to a first turbine in a first exhaust passage. Third and fourth cylinders along a second side of the V-bank are adjacent one another and flow connected to a second turbine in a second exhaust passage. Fifth and sixth cylinders at one end of the V-banks are flow connected to an EGR cooler that is connected to an intake of the engine.

In another aspect, a system includes an internal combustion engine having at least one pair of primary EGR cylinders connected to a common EGR passage to provide an EGR flow to an intake of the engine and a plurality of pairs of non-primary cylinders with each non-primary cylinder pair connected to a respective one of a plurality of common exhaust passages to provide an exhaust flow to a respective one of a plurality of turbine inlets connected to the respective common exhaust passage.

In one embodiment, the turbine inlets are separate inlets to a common turbine housing. In another embodiment, the internal combustion engine is an in-line six cylinder engine with the pair of primary EGR cylinders between first and second pairs of non-primary EGR cylinders.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
an internal combustion engine having at least one pair of primary exhaust gas recirculation (EGR) cylinders connected to a common EGR passage to provide an EGR flow to an intake of the engine and a plurality of pairs of non-primary cylinders with each non-primary cylinder pair connected to a respective one of a plurality of common exhaust passages to provide an exhaust flow to a respective one of a plurality of turbine inlets connected to the respective one of the plurality of common exhaust passages, wherein the internal combustion engine is an in-line six cylinder engine with the pair of primary EGR cylinders between first and second pairs of non-primary EGR cylinders.

2. The system of claim 1, wherein the turbine inlets are separate inlets to a common turbine housing.

3. The system of claim 2, wherein the common turbine housing is for a single turbine.

4. The system of claim 3, wherein the turbine is a twin-entry turbine and the turbine inlets are twin entries of the twin-entry turbine.

5. The system of claim 1, wherein the common EGR passage and at least two common exhaust passages are formed in a cylinder head of the engine.

6. The system of claim 1, wherein there is no EGR cooler between the pair of EGR cylinders and the intake.

7. The system of claim 1, further comprising:
a controller configured to selectively deactivate one of a first group of cylinders that includes one of the primary EGR cylinders and two of the non-primary cylinders and a second group of cylinders that includes the other of the primary EGR cylinders and the other two of the non-primary cylinders and operate the internal combustion engine as a three cylinder internal combustion engine with EGR flow from one of the pair of primary EGR cylinders and intake air flow compressed from the turbine.

8. A system comprising:
an internal combustion engine including six cylinders in an in-line configuration, wherein first and second cylinders are adjacent one another and flow connected to a turbine through a first common exhaust passage, wherein third and fourth cylinders are directly adjacent one another and flow connected to a common exhaust gas recirculation (EGR) passage to an EGR conduit that is connected to an intake manifold of the engine between third and fourth cylinders and the intake manifold, and wherein fifth and sixth cylinders are adjacent one another and flow connected to the turbine through a second common exhaust passage, wherein the third and fourth cylinders are EGR cylinders positioned between: (i) the first and second cylinders and (ii) the fifth and sixth cylinders, wherein the first, second, fifth, and sixth cylinders are non-primary cylinders.

9. The system of claim 8, further comprising:
a controller configured to selectively deactivate one of a first group of cylinders that includes the first, second and third cylinders and a second group of cylinders that includes the fourth, fifth and sixth cylinders and operate the internal combustion engine as a three cylinder internal combustion engine with EGR flow from one of the third and fourth cylinders and intake air flow compressed from the turbine.

10. The system of claim 8, wherein the turbine is a twin entry turbine that is flow coupled directly to a corresponding outlet of the first common exhaust passage, and the twin entry turbine is also flow coupled directly to a corresponding outlet of the second common exhaust passage.

11. The system of claim 8, wherein the common EGR passage and the first and second common exhaust passages are formed in a cylinder head of the engine.

12. The system of claim 8, wherein there is no EGR cooler between the third and fourth cylinders and the intake.

13. A system comprising:
an internal combustion engine having at least one pair of primary exhaust gas recirculation (EGR) cylinders connected to a common EGR passage to provide an EGR flow to an intake of the engine and a plurality of pairs of non-primary cylinders with each non-primary cylinder pair connected to a respective one of a plurality of common exhaust passages to provide an exhaust flow to a respective one of a plurality of turbine inlets connected to the respective one of the plurality of common exhaust passages; and
a controller configured to selectively deactivate one of a first group of cylinders that includes one of the primary EGR cylinders and two of the non-primary cylinders and a second group of cylinders that includes the other of the primary EGR cylinders and the other two of the non-primary cylinders and operate the internal combustion engine as a three cylinder internal combustion engine with EGR flow from one of the pair of primary EGR cylinders and intake air flow compressed from the turbine.

14. The system of claim 13, wherein the turbine inlets are separate inlets to a common turbine housing.

15. The system of claim 14, wherein the turbine is a twin-entry turbine and the turbine inlets are twin entries of the twin-entry turbine.

16. The system of claim 13, wherein the common turbine housing is for a single turbine.

17. The system of claim 13, wherein the common EGR passage and at least two common exhaust passages are formed in a cylinder head of the engine.

18. The system of claim 13, wherein there is no EGR cooler between the pair of EGR cylinders and the intake.

* * * * *